US011362378B2

(12) United States Patent
Son et al.

(10) Patent No.: US 11,362,378 B2
(45) Date of Patent: Jun. 14, 2022

(54) DEGASSING DEVICE, AND FACILITY AND METHOD FOR MANUFACTURING SECONDARY BATTERY COMPRISING THE SAME

(71) Applicant: LG Chem, Ltd., Seoul (KR)

(72) Inventors: Jae Hyoung Son, Daejeon (KR); Chang Bum Ahn, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/966,299

(22) PCT Filed: Oct. 21, 2019

(86) PCT No.: PCT/KR2019/013817
§ 371 (c)(1),
(2) Date: Jul. 30, 2020

(87) PCT Pub. No.: WO2020/145490
PCT Pub. Date: Jul. 16, 2020

(65) Prior Publication Data
US 2020/0373631 A1    Nov. 26, 2020

(30) Foreign Application Priority Data

Jan. 7, 2019  (KR) ........................ 10-2019-0001910

(51) Int. Cl.
| | |
|---|---|
| *H01M 4/82* | (2006.01) |
| *H01M 10/52* | (2006.01) |
| *H01M 10/04* | (2006.01) |
| *H01M 10/44* | (2006.01) |
| *H01M 50/30* | (2021.01) |

(52) U.S. Cl.
CPC ....... *H01M 10/52* (2013.01); *H01M 10/0404* (2013.01); *H01M 10/0413* (2013.01); *H01M 10/445* (2013.01); *H01M 50/30* (2021.01)

(58) Field of Classification Search
CPC .. H01M 10/52; H01M 10/523; H01M 10/526; H01M 10/0404; H01M 10/0413;
(Continued)

(56) References Cited

U.S. PATENT DOCUMENTS

| | | |
|---|---|---|
| 2013/0244093 A1 | 9/2013 | Min et al. |
| 2015/0086817 A1 | 3/2015 | Chung et al. |

(Continued)

FOREIGN PATENT DOCUMENTS

| | | |
|---|---|---|
| CN | 103201890 A | 7/2013 |
| CN | 104134771 A | 11/2014 |

(Continued)

OTHER PUBLICATIONS

International Search Report for Application No. PCT/KR2019/013817 dated Jan. 30, 2020, 2 pages.

(Continued)

*Primary Examiner* — Raymond Alejandro
(74) *Attorney, Agent, or Firm* — Lerner, David, Littenberg, Krumholz & Mentlik, LLP

(57) ABSTRACT

A degassing device includes a piercing unit including a piercing body configured to be disposed on a first surface of the secondary battery to seal one side of the first surface of the secondary battery, and a piercing member configured to pierce the sealed one side of the first surface of the secondary battery to form an opening hole; and a gas discharge unit including a gas discharge body configured to be disposed on a second surface of the secondary battery to seal one side of the second surface of the secondary battery, and a gas discharge member configured to discharge the gas within the secondary battery to the outside through the opening hole, wherein the piercing member is configured to form the opening hole passing from the one side of the first surface to the one side of the second surface of the secondary battery.

14 Claims, 17 Drawing Sheets

(58) Field of Classification Search
CPC .. H01M 10/445; H01M 10/446; H01M 10/44; H01M 50/30; H01M 50/308; H01M 50/317
See application file for complete search history.

(56) References Cited

U.S. PATENT DOCUMENTS

| | | | |
|---|---|---|---|
| 2015/0089800 A1* | 4/2015 | Kim | H01M 10/0481 29/623.2 |
| 2016/0079579 A1 | 3/2016 | Jung | |
| 2016/0308181 A1 | 10/2016 | Kato et al. | |
| 2018/0034097 A1 | 2/2018 | Uwai et al. | |
| 2018/0115012 A1 | 4/2018 | Locke et al. | |
| 2019/0207183 A1 | 7/2019 | Park et al. | |
| 2019/0207241 A1 | 7/2019 | Park et al. | |

FOREIGN PATENT DOCUMENTS

| | | | |
|---|---|---|---|
| CN | 107690721 | A | 2/2018 |
| EP | 2648261 | A2 | 10/2013 |
| EP | 3474364 | A1 | 4/2019 |
| JP | 2000353547 | A | 12/2000 |
| JP | 2001283923 | A | 10/2001 |
| JP | 2015220199 | A | 12/2015 |
| KR | 20080076681 | A | 8/2008 |
| KR | 20160032590 | A | 3/2016 |
| KR | 20160076608 | A | 7/2016 |
| KR | 20160086376 | A | 7/2016 |
| KR | 20160118082 | A | 10/2016 |
| KR | 20170020997 | A | 2/2017 |
| KR | 101748362 | B1 | 6/2017 |
| KR | 20170103192 | A | 9/2017 |
| KR | 20170110150 | A | 10/2017 |
| KR | 20180061665 | A | 6/2018 |
| KR | 20180062835 | A | 6/2018 |
| KR | 20180062839 | A | 6/2018 |

OTHER PUBLICATIONS

Search Report dated Apr. 8, 2022 from Office Action for Chinese Application No. 201980009607.7 issued Apr. 13, 2022. 3 pgs. (see p. 1-2, categorizing the cited references).

* cited by examiner

DEGASSING DEVICE, AND FACILITY AND METHOD FOR MANUFACTURING SECONDARY BATTERY COMPRISING THE SAME

CROSS-REFERENCE TO RELATED APPLICATION

The present application is a national phase entry under 35 U.S.C. § 371 of International Application No. PCT/KR2019/013817, filed Oct. 21, 2019, which claims the benefit of the priority of Korean Patent Application No. 10-2019-0001910, filed on Jan. 7, 2019, which are hereby incorporated by reference in their entireties.

TECHNICAL FIELD

The present invention relates to a degassing device, and a facility and method for manufacturing a secondary battery comprising the same, and more particularly, to a degassing device that discharges and removes a gas generated in a secondary battery to the outside, and a facility and method for manufacturing the secondary battery comprising the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Also, the secondary batteries may be variously classified according to a structure of an electrode assembly. For example, the secondary batteries may be classified into a stacking type structure, a jelly-roll-type structure, or a stacking/folding type structure.

Such a secondary battery comprises an electrode assembly and a case accommodating the electrode assembly, and the electrode assembly has a structure in which electrodes and separators are alternately stacked.

A method for manufacturing the secondary battery having the above structure comprises a packaging process of accommodating an electrode assembly together with an electrolyte in a pouch to manufacture the secondary battery and a charging/discharging process of charging and discharging the secondary battery to activate the secondary battery.

However, the secondary battery has a problem in that the secondary battery is swelled while generating a large amount of gas within the secondary battery during the charging/discharging. In particular, the secondary battery has a problem in that charging/discharging efficiency is significantly reduced due to the swelling.

DISCLOSURE OF THE INVENTION

Technical Problem

The present invention has been invented to solve the above problems, an object of the present invention is to provide a degassing device that discharges a gas generated in a secondary battery to the outside during the charging/discharging of the secondary battery to prevent the secondary battery from being swelled, thereby improving charging/discharging efficiency of the secondary battery, and a facility and method for manufacturing the secondary battery comprising the same.

Technical Solution

A degassing device according to a first embodiment of the present invention for achieving the above object is configured to discharge a gas generated in a secondary battery to the outside and comprises: a piercing unit comprising a piercing body configured to be disposed on a first surface of the secondary battery to seal one side of the first surface of the secondary battery, and a piercing member configured to pierce the sealed one side of the first surface of the secondary battery to form an opening hole in the secondary battery; and a gas discharge unit comprising a gas discharge body configured to be disposed on a second surface of the secondary battery to seal one side of the second surface of the secondary battery, in which the opening hole is formed, and a gas discharge member configured to discharge the gas within the secondary battery to the outside through the opening hole, wherein the piercing member is configured to form the opening hole passing from the one side of the first surface to the one side of the second surface of the secondary battery.

The piercing body may comprise: a first sealing part formed on one surface of the piercing body and configured to seal one side of the first surface of the secondary battery; a guide passage extending from an outlet hole formed inside the first sealing part and connected to the outlet hole; and first and second air injection parts through which air is injected into one side and another side of the guide passage, respectively.

The piercing member may comprise: a piercing part provided in the outlet hole and configured to pierce the one side of the first surface of the secondary battery while being withdrawn out of the outlet hole to form the opening hole; and a piston part provided in the guide passage and configured to withdraw the piercing part out of the outlet hole while moving forward in a direction of the piercing part when the air is introduced through the first air injection part, and configured to insert the piercing part into the outlet hole while returning to its original position when the air is introduced into the guide passage through the second air injection part.

The piercing part may comprise: a piercing pin provided in the outlet hole to pierce the one side of the first surface of the secondary battery while being withdrawn out of the outlet hole; and a piercing piece having one end connected to the piston part and another end connected to the piercing pin to withdraw or insert the piercing pin out of or into the outlet hole when the piston part moves forward or returns to its original position.

A guide hole may be formed in the piercing pin in a longitudinal direction of the piston part, wherein the guide hole may be gradually inclined toward the outlet hole from an end of one side that is close to the piston part to an end of another side, the piercing piece may be provided with a coupling shaft that is freely rotatably coupled to the guide hole, and the coupling shaft may withdraw the piercing pin out of the outlet hole while moving to the end of the another side of the guide hole when the piercing piece moves forward together with the piston part and insert the piercing pin into the outlet hole while moving from the end of the another side to the end of the one side of the guide hole when the piercing pin returns to its original position together with the piston part.

The gas discharge body may comprise: a second sealing part formed on one surface of the gas discharge body and configured to seal one side of the second surface of the secondary battery; a suction hole provided inside the second sealing part; and an insertion passage provided in the gas discharge body and connected to the suction hole, wherein the gas discharge member may be inserted into the insertion passage to discharge the gas generated in the secondary battery to the outside through the opening hole disposed in the suction hole by using suction force.

The degassing device may further comprise a sealing unit configured to seal a surface of the secondary battery in which the opening hole is formed, wherein the sealing unit may comprise first and second heating members configured to press the first and second surfaces, respectively, of the secondary battery, and configured to simultaneously apply heat to the first and second surfaces of the secondary battery to seal the opening hole, wherein the first and second heating members may be configured to press the secondary battery and to simultaneously apply heat to the secondary battery to seal the opening hole.

The first heating member may comprise a first insertion surface inserted into a first insertion groove formed in one surface of the piercing body in a shape that surrounds the first sealing part and a first sealing surface configured to seal the one side of the first surface of the secondary battery, in which the opening hole is formed, wherein the first sealing surface has a size less than that of the first insertion surface, and the second heating member may comprise a second insertion surface inserted into a second insertion groove formed in one surface of the gas discharge body in a shape that surrounds the second sealing part and a second sealing surface configured to seal the one side of the second surface of the secondary battery, in which the opening hole is formed, wherein the second sealing surface has a size less than that of the second insertion surface.

Each of the first insertion groove and the first insertion surface has a polygonal shape, or each of the second insertion groove and the second insertion surface may have a polygonal shape.

The degassing device may further comprise a cover unit provided with a first fixing cover fixing the first heating member inserted into the first insertion groove of the piercing body and a second fixing cover fixing the second heating member inserted into the second insertion groove of the gas discharge body.

The degassing device may further comprise a moving unit that allows the piercing unit and the gas discharge unit to move in a direction in which the piercing unit and the gas discharge unit are close to each other or in a direction in which the piercing unit and the gas discharge unit are farther away from each other.

The moving unit may comprise a first moving member provided with a first fixing part fixed to the piercing unit and a first cylinder allowing the first fixing part to move so as to be closely attached to the one surface of the secondary battery or so as not to be closely attached to the secondary battery; and a second moving member provided with a second fixing part fixed to the gas discharge unit and a second cylinder allowing the second fixing part to move so as to be closely attached to the other surface of the secondary battery or so as not to be closely attached to the secondary battery.

The degassing device may further comprise an elevation device configured to allow the piercing unit and the gas discharge unit to descend toward the secondary battery or return to their original positions.

The elevation unit may be connected to the piercing unit and the gas discharge unit and comprise a connection member connecting the piercing unit and the gas discharge unit so that the piercing unit and the gas discharge unit are movable in a direction of the secondary battery or a direction opposite to the direction of the secondary battery and a moving cylinder allowing the connection member to descend or return to its original position so that the piercing unit and the gas discharge unit descend or return to its original position in the direction of the secondary battery.

The degassing device may further comprise a guide unit provided with a first guide member disposed on a bottom surface of the piercing unit and configured to face the secondary battery and a second guide member disposed on a bottom surface of the gas discharge unit and configured to face the secondary battery, wherein the bottom surfaces of the first and second guide members may be formed as inclined surfaces that are inclined toward the secondary battery.

A facility for manufacturing a secondary battery according to a second embodiment of the present invention comprises: a main body configured for the secondary battery to be seated thereon; and a degassing device which discharges a gas generated in the secondary battery when the secondary battery is seated on the main body to the outside, wherein the degassing device comprises: a piercing unit comprising a piercing body configured to be disposed on a first surface of the secondary battery to seal one side of the first surface of the secondary battery, and a piercing member configured to pierce the sealed one side of the first surface of the secondary battery to form an opening hole in the secondary battery; and a gas discharge unit comprising a gas discharge body configured to be disposed on a second surface of the secondary battery to seal one side of the second surface of the secondary battery, in which the opening hole is formed, and a gas discharge member configured to discharge the gas within the secondary battery to the outside through the opening hole, wherein the piercing member is configured to form the opening hole passing from the one side of the first surface to the one side of the second surface of the secondary battery.

The facility may further comprise a moving device provided with a front/rear moving unit allowing the degassing device in a longitudinal direction of the secondary battery and a left/right moving unit allowing the degassing device in a thickness direction of the secondary battery seated on the main body.

The facility may further comprise a charging/discharging device that charges and discharges the secondary battery seated on the main body to activate the secondary battery.

A method for manufacturing a secondary battery according to a second embodiment of the present invention comprises: a seating step of seating one or more secondary batteries on a main body; a primary charging/discharging step of primarily charging the one or more secondary batteries seated on the main body at a first voltage by using a charging/discharging device; a secondary charging/discharging step of secondarily charging and discharging the one or more secondary batteries, which is primarily charged and discharged, at a second voltage by using the charging/discharging device; a gas discharge step of discharging a gas generated in the one or more secondary batteries, which is secondarily charged and discharged, to the outside by using the degassing device described above; and a tertiary charging/discharging step of tertiarily charging and discharging the one or more secondary batteries, from which the gas is discharged, at a third voltage by using the charging/discharging device.

The secondary charging/discharging step (S30) and the gas discharge step (S40) may be performed at the same time.

Advantageous Effects

The degassing device according to the present invention may comprise the piercing unit and the gas discharge unit. Therefore, the gas generated in the secondary battery may be effectively reduced to prevent the secondary battery from being deformed.

In addition, the facility for manufacturing the secondary battery may comprise the degassing device provided with the piercing unit and the gas discharge unit. Therefore, the gas generated in the secondary battery may be discharged to the outside while the secondary battery is charged and discharged to prevent the secondary battery from being deformed, thereby improving the charging/discharging efficiency.

BRIEF DESCRIPTION OF THE DRAWINGS

FIGS. 11 to 13 are views illustrating a method for operating the degassing device according to the first embodiment of the present invention, wherein FIG. 11 is a cross-sectional view of a secondary battery sealing process, FIG. 12 is a cross-sectional view of a secondary battery piercing process, and FIG. 13 is a cross-sectional view illustrating a secondary battery gas discharging process.

MODE FOR CARRYING OUT THE INVENTION

Figure 1:
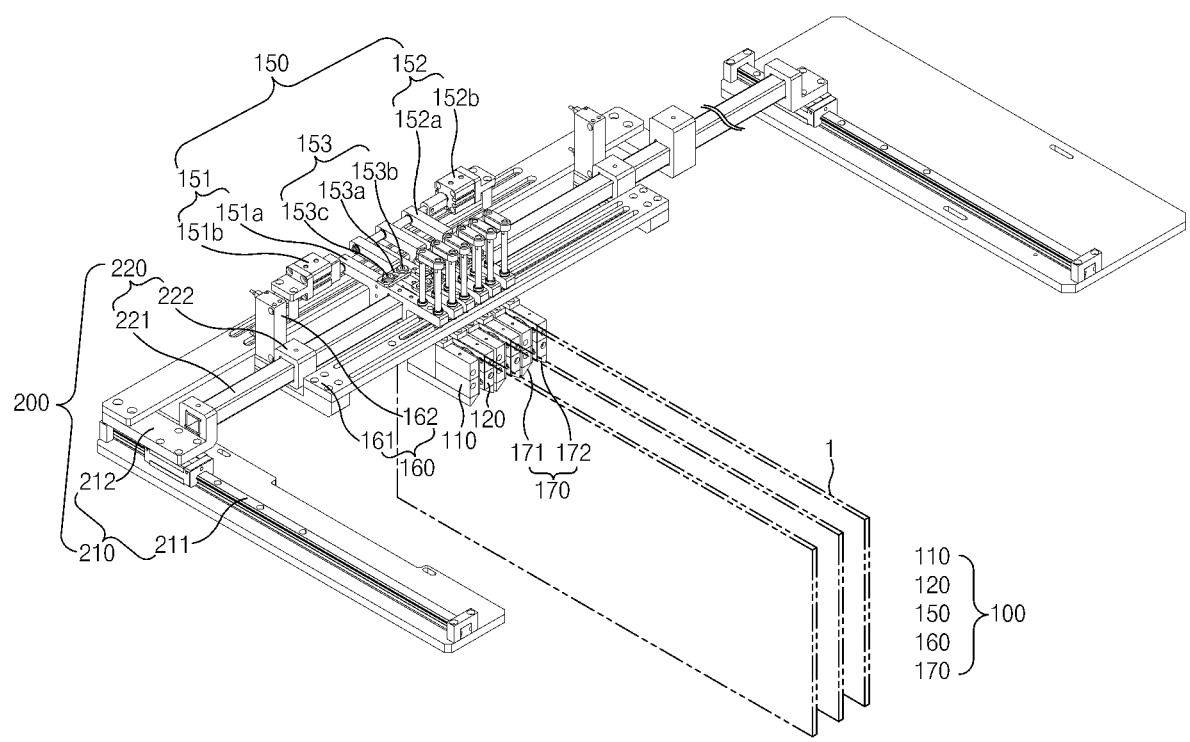
FIG. 1 is a perspective view of a degassing device according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Degassing Device According to First Embodiment of the Present Invention]

Figure 2:
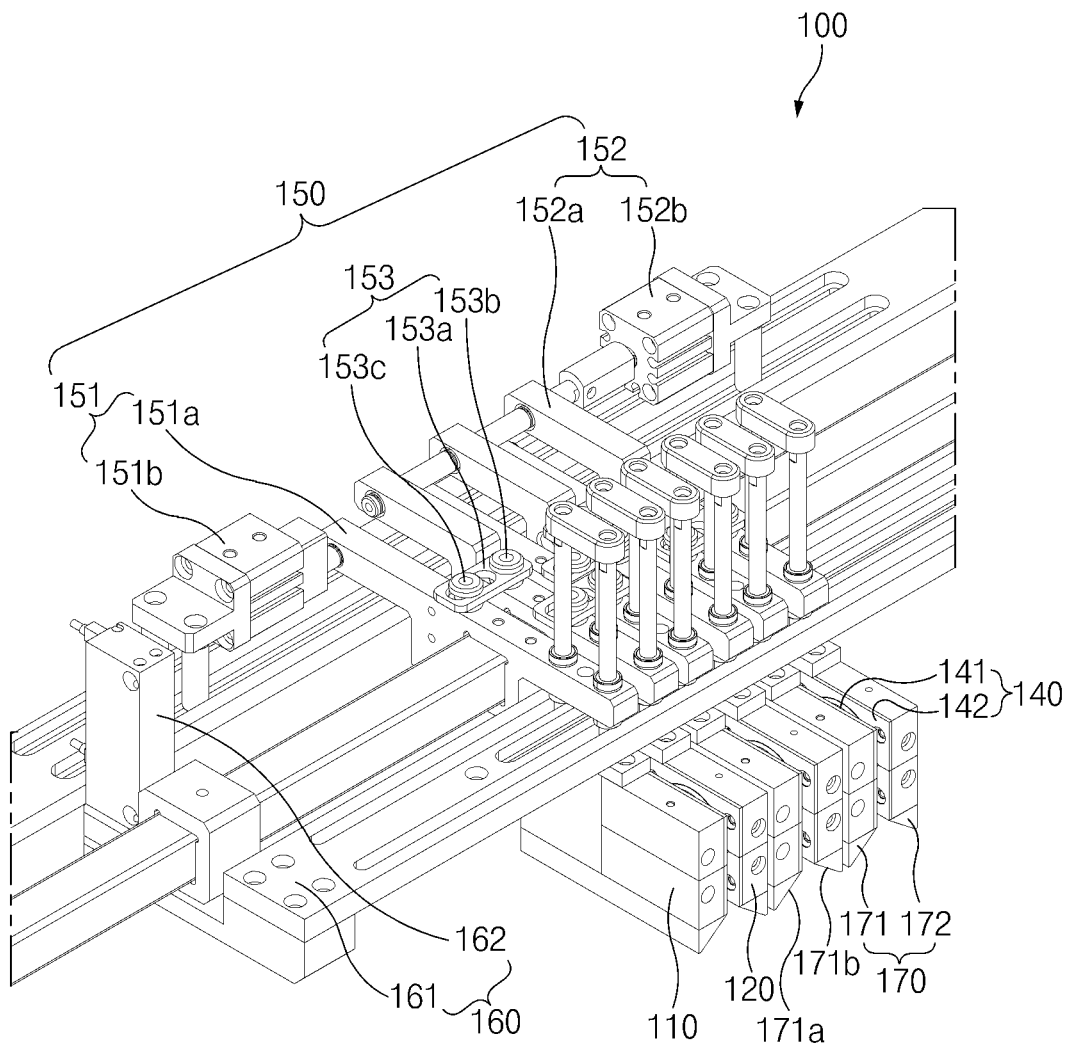
FIG. 2 is a partial enlarged view of FIG. 1.
Figure 3:
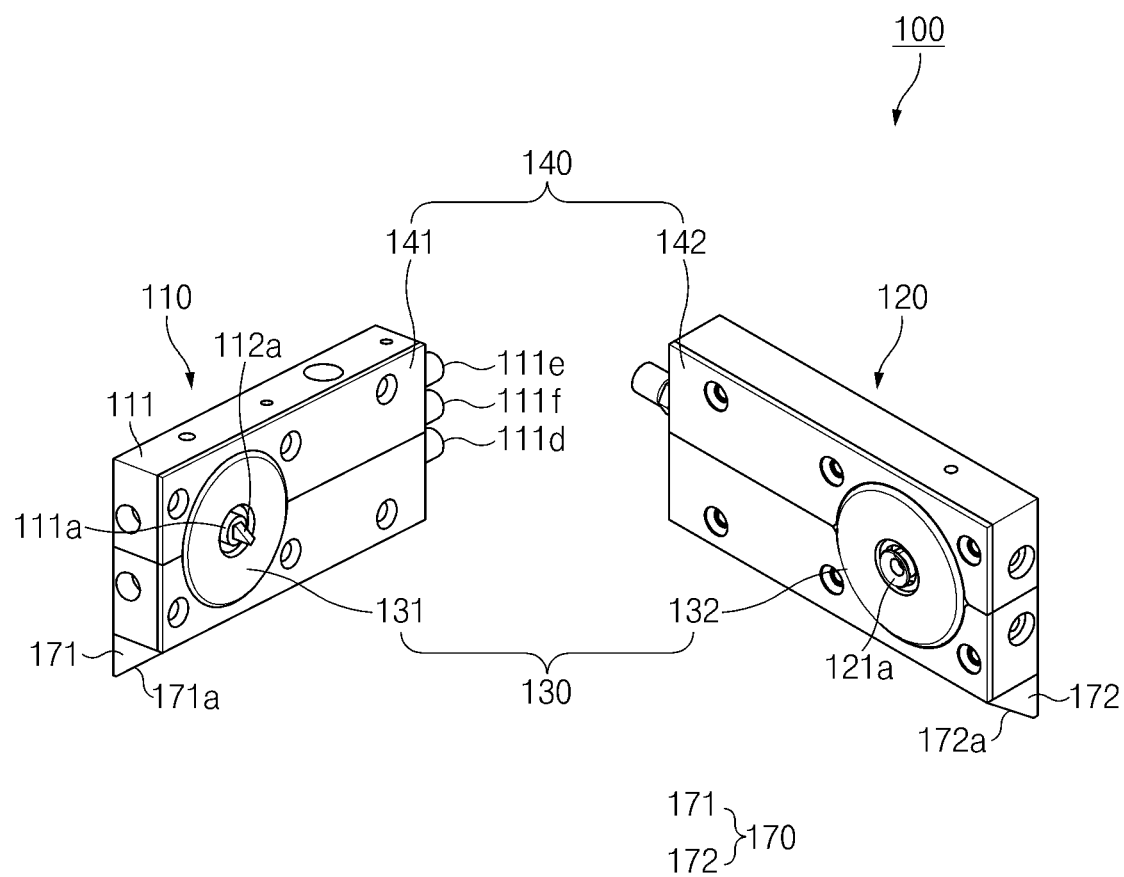
FIG. 3 is a perspective view illustrating a piercing unit and a gas discharge unit of the degassing device according to the first embodiment of the present invention.

As illustrated in FIGS. 1 and 2, a degassing device 100 according to a first embodiment of the present invention has a structure in which a gas generated in a secondary battery 1 is discharged to the outside and comprises a piercing unit 110, a gas discharge unit 120, a sealing unit 130, a cover unit 140, a moving unit 150, an elevation unit 160, and a guide unit 170.

Description of Configuration of Piercing Unit

As illustrated in FIGS. 3 to 7, the piercing unit 110 pierces the secondary battery to form an opening hole and comprises a piercing body 111 disposed on one surface of the secondary battery 1 to seal one side of the one surface of the secondary battery 1 and a piercing member 112 piercing the one side of the one surface of the secondary battery 1, which is sealed by the piercing body 111 to form an opening hole 1a.

Here, the piercing member 112 pierces the secondary battery 1 so that the secondary battery 1 passes from the one side of the one surface to one side of the other side thereof, thereby forming the opening hole 1a.

The piercing body 111 may comprises a first sealing part 111a formed on one surface (a left surface of the piercing body when viewed in FIG. 3) to seal one side of the one surface of the secondary battery 1, a guide passage 111c formed within an outlet hole 111b formed inside the first sealing part 111a and connected to the outlet hole 111b, and first and second air injection parts 111d and 111e through which air is injected into the guide passage 111c.

The first sealing part 111a is formed on one surface of the piercing body 111 in a circular frame shape. The first sealing part 111a having the circular frame shape may be closely attached to one side of one surface of the secondary battery 1 to seal the one side of the one surface of the secondary battery, which is disposed inside the sealing part 111a. A pad member having heat resistance to improve sealability may be further provided on a front end of the first sealing part 111a. Thus, the sealability between the first sealing member 111a and the one side of the one surface of the secondary battery 1 may be improved.

The outlet hole 111b is formed in one surface of the piercing body 111, which is disposed inside the first sealing part 111a, in particular, the outlet hole 111b is formed as an outlet groove that is opened in a direction of the one surface of the piercing body 111.

Also, a protrusion 111b-1 protruding from the one surface of the piercing body 111 is formed on an inlet of the outlet hole 111b. The protrusion 111b-1 has a circular frame shape formed along an outer circumferential surface of the outlet hole 111b. Thus, the protrusion 111b-1 may stably support a piercing pin that is withdrawn out of the outlet hole 111b to significantly prevent the piercing pin from moving.

The outlet hole 111b may have a rectangular cross-sectional shape, and the piercing pin disposed in the outlet hole 111b having the rectangular cross-sectional shape may also have a rectangular shape. As a result, even though the piercing pin is withdrawn or inserted along the outlet hole 111b, the piercing pin may be prevented from rotating in a left or right direction, and thus, stable movement of the piercing pin may be induced.

The guide passage 111c may be formed inside the piercing body 111 in a longitudinal direction (a left/right direction when viewed in FIG. 5) of the piercing body 111. The guide passage 111c has one end (a left end when viewed in FIG. 5) connected to one side of the outlet hole 111b and the other end (a right end when viewed in FIG. 5) that is finished by a fixing piece 111f in a state of passing through the other side (a right surface of the piercing body when viewed in FIG. 5) of the piercing body 111.

Figure 5:
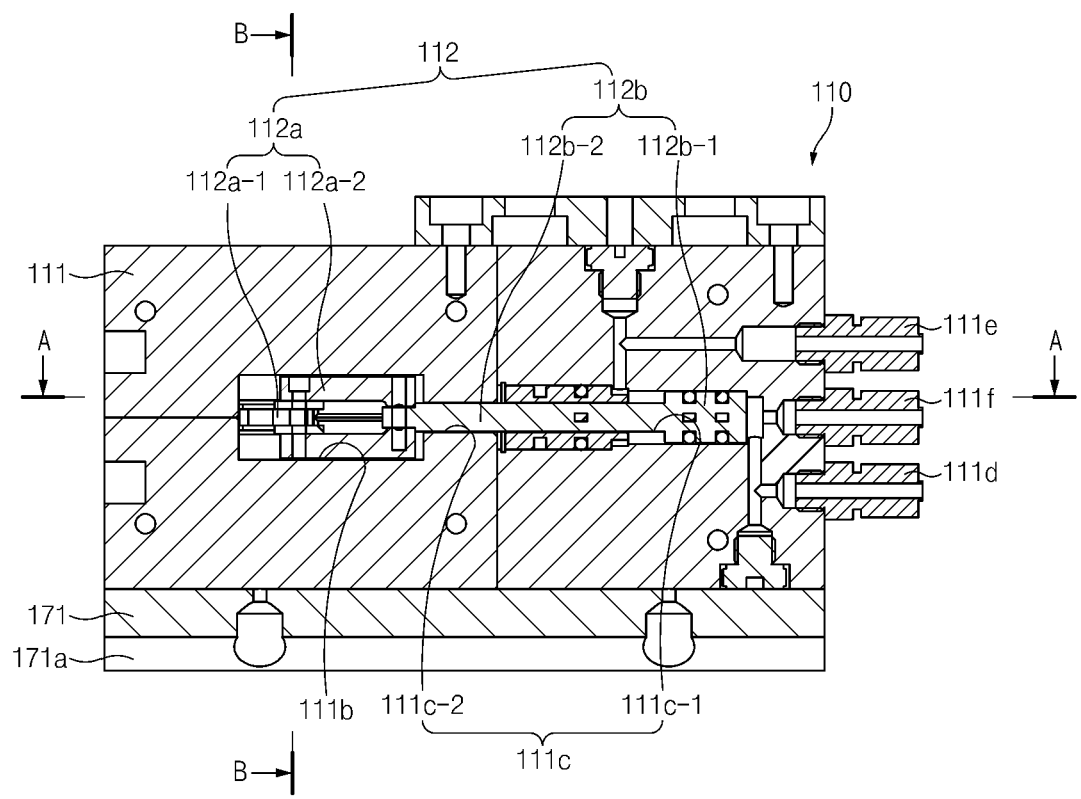
FIG. 5 is a cross-sectional view illustrating the piercing unit of the degassing device according to the first embodiment of the present invention.
Figure 6:
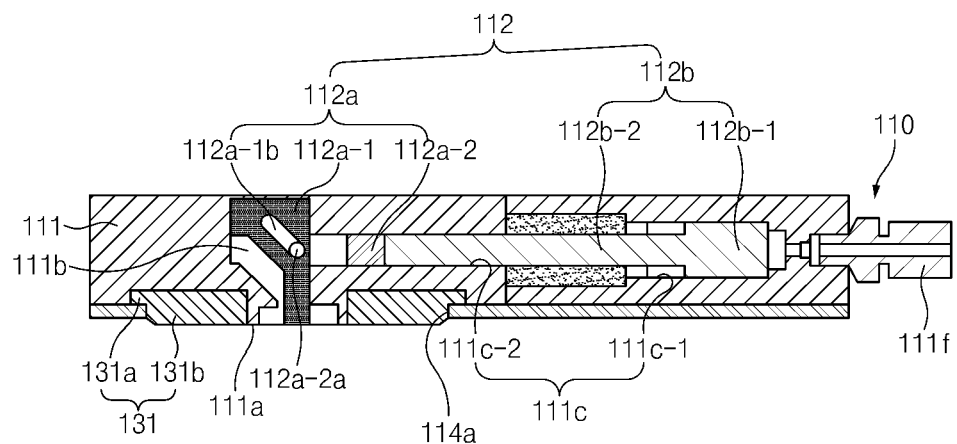
FIG. 6 is a cross-sectional view taken along line A-A of FIG. 5.
Figure 7:
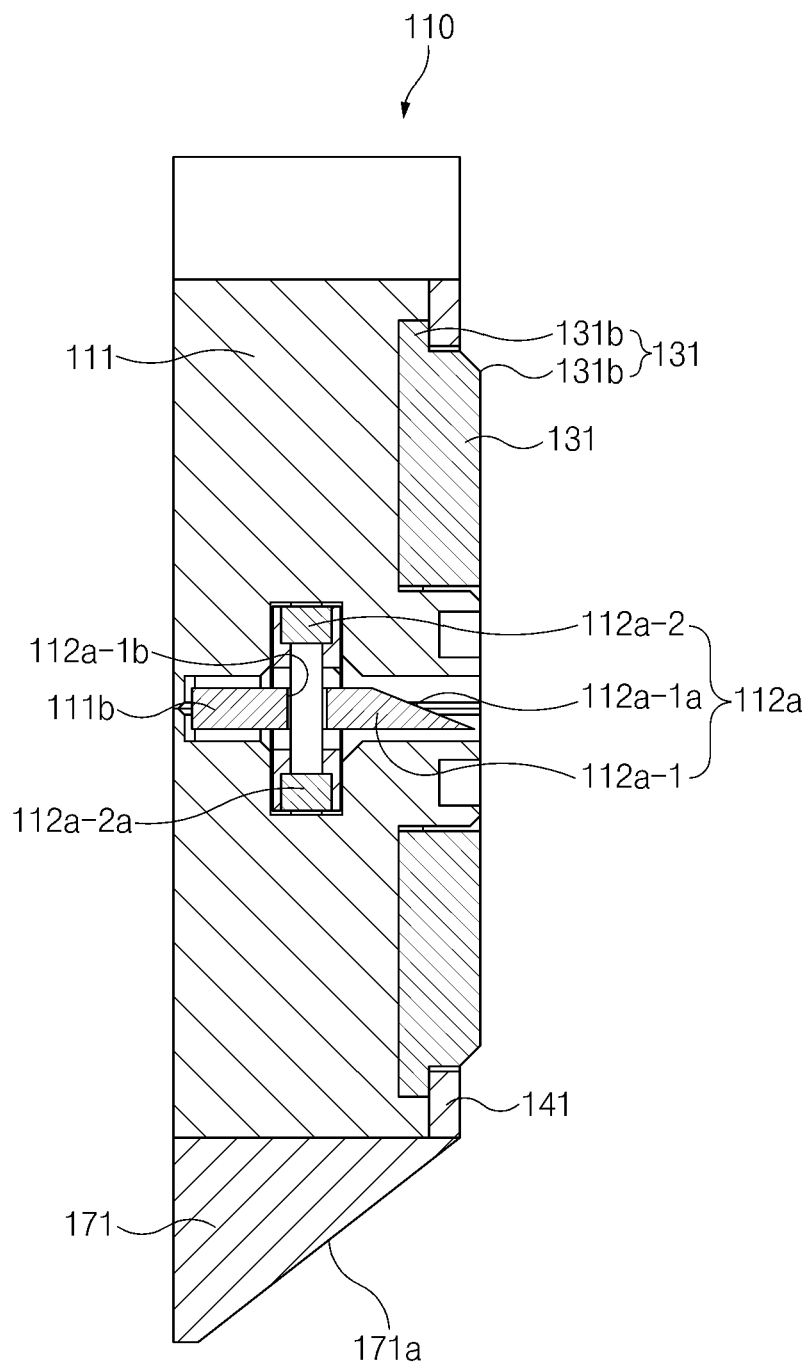
FIG. 7 is a cross-sectional view taken along line B-B of FIG. 5.

Particularly, referring to FIG. 5, the guide passage 111c comprises a piston chamber 111c-1 formed inside the other side of the piercing body 111 and a connection chamber 111c-2 connecting the piston chamber 111c-1 to the outlet hole 111b.

The first and second air injection parts 111d and 111e are configured to inject air into the guide passage 111c. The first air injection part 111d is connected to one side of the guide passage 111c, and the second air injection part 111e is connected to the other side of the guide passage 111c. That is, the first air injection part 111d injects the air into the one side of the guide passage 111c to allow a piston part provided in the guide passage 111c to move forward in a direction of the piercing part, and the second air injection part 111e injects the air into the other side of the guide passage 111c to allow the piston part provided in the guide passage 111c to move backward in a direction opposite to the piercing part.

The piercing member 112 comprises a piercing part 112a provided in the outlet hole 111b and piercing the one side of the one surface of the secondary battery 1 while being withdrawn out of the outlet hole 111b to form the opening hole and the piston part 112b provided in the guide passage 111c, withdrawing the piercing part 112a out of the outlet hole 111b while moving forward in the direction of the piercing part 112a when the air is introduced through the first air injection part 111d, and inserting the piercing part 112a into the outlet hole 111b while moving backward in the direction opposite to the piercing part 112a when the air is introduced into the guide passage 111c through the second air injection part 111e.

For clear description of the present invention, hereinafter, the moving forward in the direction of the piercing part 112a will be referred to as "forward movement", and moving backward in the direction opposite of the piercing part 112a will be referred to as "backward movement".

The piercing part 112a comprises a piercing pin 112a-1 provided in the outlet hole 111b to pierce the one side of the one surface of the secondary battery 1 while being withdrawn out of the outlet hole 111b to form the opening hole 1a and a piercing piece 112a-2 withdrawing or inserting the piercing pin 112a-1 into or out of the outlet hole 111b when the piston part 112b moves forward or backward.

The piercing pin 112a-1 is configured to pierce the one side of the one surface of the secondary battery and has one end on which a blade 112a-1a for piercing the one side of the one surface of the secondary battery 1 is formed and the other end in which a guide hole 112a-1b connected to the piercing piece 112a-1 is formed.

Here, the guide hole 112a-1b is formed to be inclined in a longitudinal direction of the piston part 112b. That is, the guide hole 112a-1b may disposed near the piston part 112b and formed to be inclined from an upper end a of an inlet side of the outlet hole 111b to a lower end b disposed at a bottom side of the outlet hole 111b. That is to say, referring to FIG. 6, the guide hole 112a-1b is formed to be inclined from an upper end disposed at a right side to a lower end disposed at a right side.

The piercing piece 112a-2 has one end connected to the piston part 112b and the other end connected to the piercing pin 112a-1. As a result, the piercing piece 112a-2 may be withdrawn from or inserted into the outlet hole 111b when the piston part 112b moves forward or backward.

Figure 11:
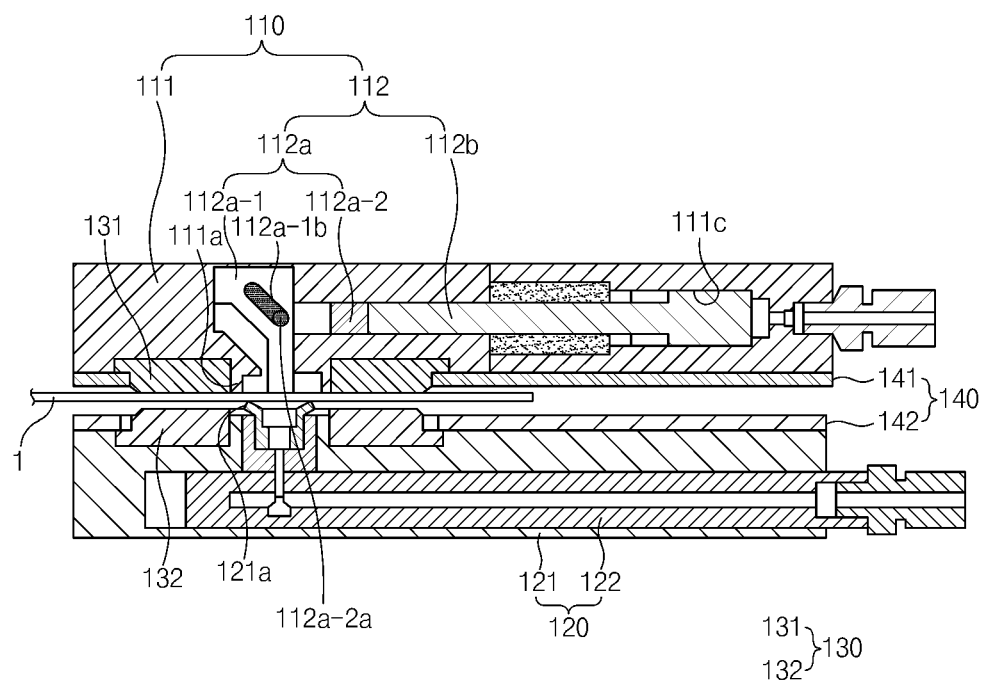
Figure 12:
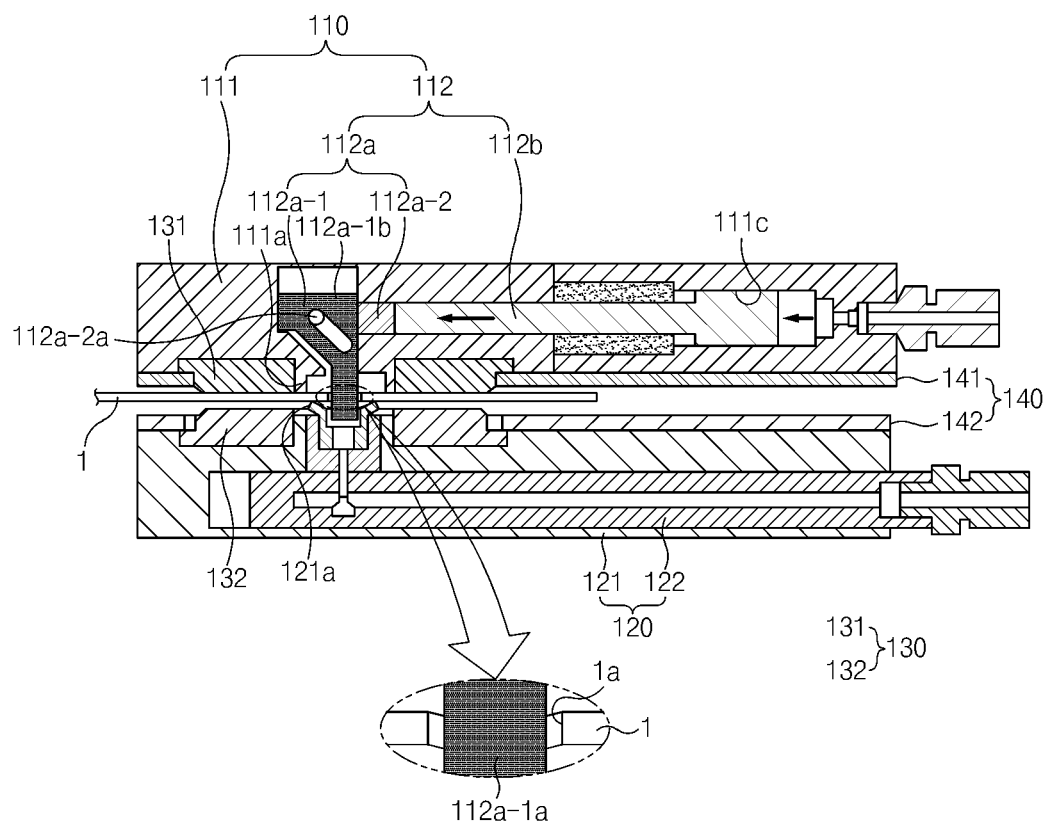

Here, the piercing piece 112a-2 is provided with a coupling shaft 112a-2a freely rotatably coupled to the guide hole 112a-1b. That is, as illustrated in FIG. 12, the coupling shaft 112a-2a of the piercing piece 112a-2 withdraws the piercing pin out of the outlet hole while moving from the upper end a to the lower end b of the guide hole 112a-b when the piercing piece moves forward by the piston part. Also, as illustrated in FIG. 11, the coupling shaft 112a-2 of the piercing piece 112a-2 inserts the piercing pin into the outlet hole 111b while moving from the lower end b to the upper end a of the guide hole 112a-1b when the piercing pin 112a-2 moves backward by the piston part.

The piston part 112b comprises a piston 112b-1 provided in the piston chamber 111c-1 of the guide passage 111c and a connection bar 112b-2 connected to the piercing piece 112a-2 through the connection chamber 111c-2.

Description of Operation of Piercing Unit

An operation state of the piercing unit 110 having the above-described configuration will be described as follows.

First, when the first sealing part 111a provided on the piercing body 111 is closely attached to the one side of the one surface of the secondary battery 1, the one side of the one surface of the secondary battery 1 may be sealed by the first sealing part 111a. In this state, when the air is injected into the guide passage 111c through the first air injection part 111d of the piercing body 111, the piston part 112b allows the piercing piece 112a-2 of the piercing part 112a to move forward while moving forward, and the piercing piece 112a-2 withdraws the piercing pin 112a-1 out of the outlet hole 111b while moving forward. Thus, the piercing pin 112a-1 pierces the one side of the one surface of the secondary battery 1 while being withdrawn out of the outlet hole 111b to form the opening hole.

When the opening hole is completely formed, if the air is injected into the guide passage 111c through the second air injection part 111e of the piercing body 111, the piston part 112b allows the piercing piece 112a-2 of the piercing part 112a to move backward while moving backward, and the piercing piece 112a-2 inserts the piercing pin 112a-1 into the outlet hole 111b while moving backward.

Thus, the piercing unit 110 having the above-described configuration may stably form the opening hole in the one surface of the secondary battery.

A discharge part 111g connected to the guide passage 111c may be further formed in the piercing body 111. The discharge part 111g may forcibly discharge the air introduced into the guide passage 111c to the outside.

Description of Configuration of Gas Discharge Unit

As illustrated in FIGS. 3 and 8 to 10, the gas discharge unit 120 comprises a gas discharge body 121 disposed on the other surface of the secondary battery 1 to seal the one side of the other surface of the secondary battery 1, in which the opening hole 1a is formed, and a gas discharge member 122 discharging a gas within the secondary battery 1 to the outside through the opening hole 1*a*.

The gas discharge body 121 comprises a second sealing part 121*a* formed on one surface to seal one side of the other surface of the secondary battery 1, a suction hole 121*b* provided inside the second sealing part 121*a*, and an insertion passage 121*c* provided in the gas discharge body 121 and connected to the suction hole 121*b*.

The second sealing part 121*a* seals the one side of the other surface of the secondary battery 1, which corresponds to the first sealing part 111*a*, and is formed on one surface of the gas discharge body 121 in a circular frame shape. Also, the second sealing part 121*a* having the circular frame shape is closely attached to the one side of the other surface of the secondary battery 1. Therefore, the one side of the other surface of the secondary battery 1, which is disposed inside the second sealing part 121*a*, is sealed. A pad member having heat resistance to improve sealability may be further provided on a front end of the second sealing part 121*a*.

The gas discharge member 122 is inserted into the insertion passage 121*c* to discharge the gas generated in the secondary battery 1 to the outside through the opening hole la disposed in the suction hole 121*b* by using suction force.

Thus, the gas discharge unit 120 having the above-described configuration may discharge the gas generated in the secondary battery 1 through the opening hole 1*a* formed in the secondary battery 1 to remove the gas.

Hereinafter, a method for operating the degassing device 100 having the above-described configuration according to the first embodiment of the present invention will be described.

[Method for Operating Degassing Device According to First Embodiment of the Present Invention]

That is, a method for operating the degassing device according to the first embodiment of the present invention comprises a secondary battery sealing process, a secondary battery piercing process, and a secondary battery gas discharging process.

Secondary Battery Sealing Process

As illustrated in FIG. 11, in the secondary battery sealing process, a piercing unit 110 and a gas discharge unit 120 are disposed on one surface and the other surface of the secondary battery to correspond to each other.

Next, the piercing unit 110 and the gas discharge unit 120 move in a direction in which the piercing unit 110 and the gas discharge unit 120 are close to each other so as to be closely attached to the secondary battery 1. Thus, a first sealing part 111*a* of a piercing body 111 provided in the piercing unit 110 seals one side of the one surface of the secondary battery 1 while being closely attached to the one surface of the secondary battery 1, and a second sealing part 121*a* of a gas discharge body 121 provided in the gas discharge unit 120 seals one side of the other surface of the secondary battery 1 while being closely attached to the one side of the other surface of the secondary battery 1.

Secondary Battery Piercing Process

As illustrated in FIG. 12, in the secondary battery piercing process, air is injected into a piston chamber 111*c*-1 of a guide passage 111*c* through a first air injection part 111*d* of the piercing body 111. Thus, a piston part 112*b* moves forward by the air injected into one side of the piston chamber 111*c*-1, and the piercing part 112*a* is withdrawn out of an outlet hole 111*b* by the piston part 112*b* to pierce the one side of the one surface of the secondary battery 1, thereby forming an opening hole.

In more detail, when the piston part 112*b* moves forward, a piercing piece 112*a*-2 of the piercing part 112*a* is interlocked with the piston part 112*b* to move forward. Here, a coupling shaft 112*a*-2*b* formed on the piercing piece 112*a*-2 presses a piercing pin 112*a*-1 toward the outside of the outlet hole 111*b* while moving forward along a guide hole of the piercing pin 112*a*-1. As a result, the piercing pin 112*a*-1 is withdrawn out of the outlet hole 111*b* to pierce the one side of the one surface of the secondary battery 1, thereby forming the opening hole. Here, the piercing pin of a piercing member may form the opening hole 1*a* that passes from the one side of the one surface to the one side of the other surface of the secondary battery.

When the opening hole is completely formed, air is injected into the piston chamber 111*c*-1 of the guide passage 111*c* through a second air injection part 111*e* of the piercing body 111. Thus, the piston part 112*b* moves backward by the air injected into the other side of the piston chamber 111*c*-1, and the piercing part 112*a* is inserted into the outlet hole 111*b* of the piercing body 111 by the piston part 112*b*.

In more detail, when the piston part 112*b* moves backward, the piercing piece 112*a*-2 of the piercing part 112*a* is interlocked with the piston part 112*b* to move backward. Here, the coupling shaft formed on the piercing piece 112*a*-2 presses the piercing pin 112*a*-1 toward the inside of the outlet hole 111*b* while moving backward along the guide hole of the piercing pin 112*a*-1. As a result, the piercing pin 112*a*-1 may be inserted into the outlet hole 111*b*.

Secondary Battery Gas Discharging Process

Figure 13:
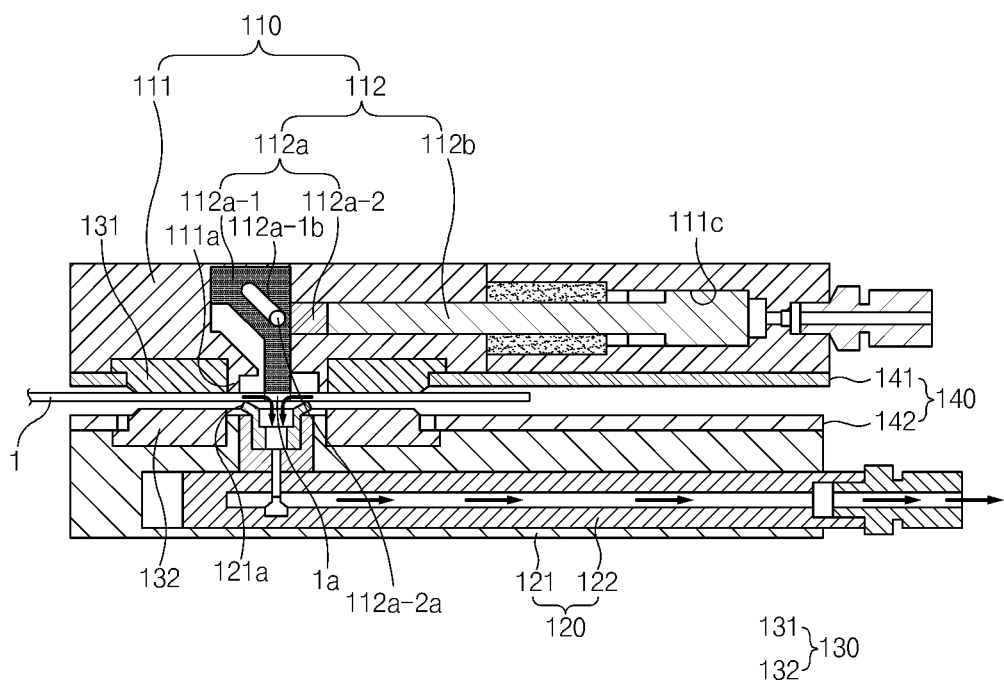

As illustrated in FIG. 13, in the secondary battery gas discharging process, when suction force is generated through the gas discharge member 122 provided in the gas discharge unit 120, the suction force is generated in a suction hole 121*b* provided inside the second sealing part 121*a* to forcibly suction the gas within the secondary battery 1 through the opening hole 1*a* of the secondary battery 1 so as to discharge the gas to the outside.

Thus, the degassing device 100 according to the first embodiment of the present invention comprises the piercing unit 110 and the gas discharge unit 120 to effectively remove the gas generated in the secondary battery.

The degassing device 100 according to the first embodiment of the present invention may further comprise a sealing unit sealing a surface of the secondary battery to seal the opening hole 1*a* formed in the secondary battery 1.

Sealing Unit

Figure 4:
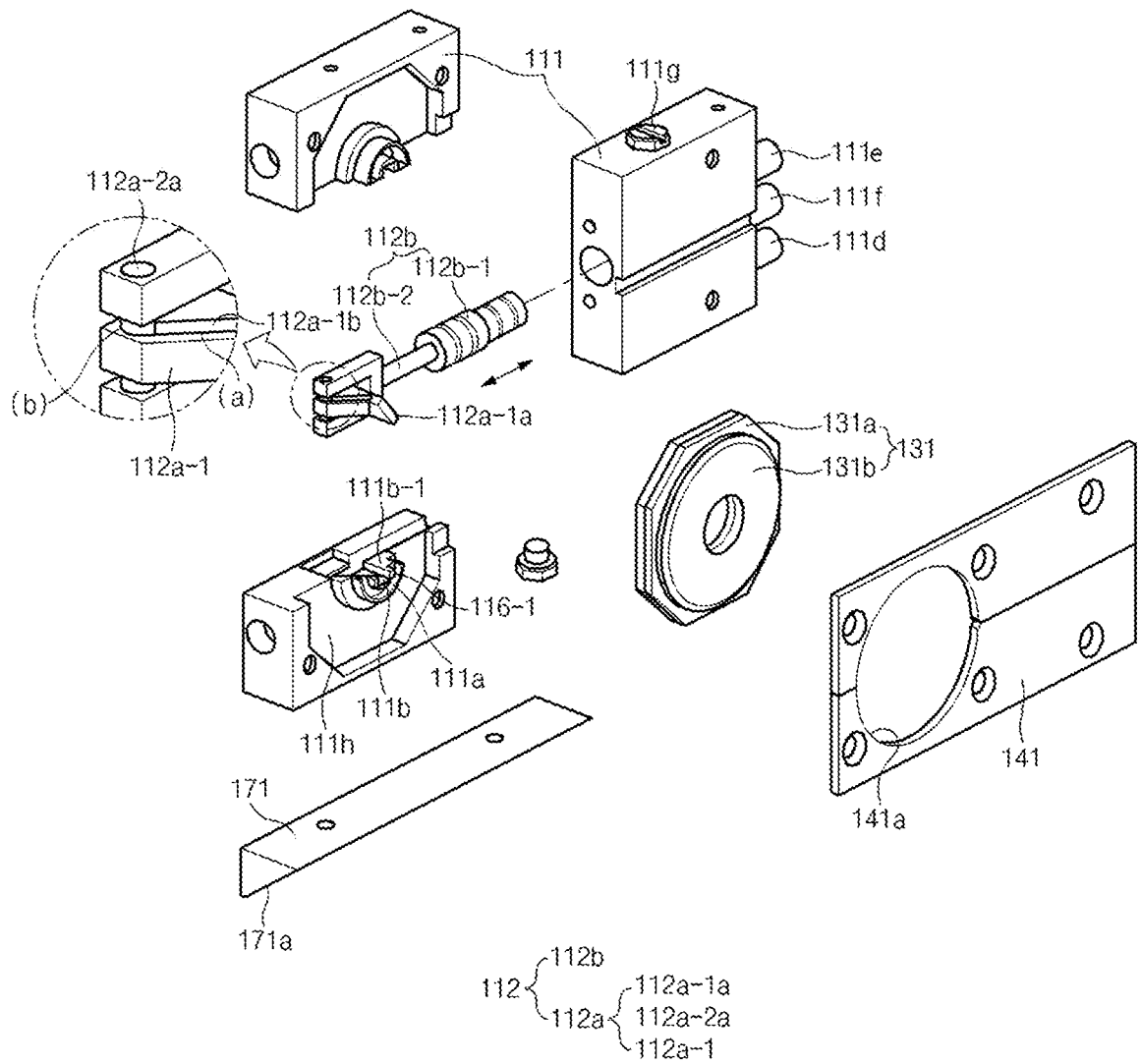
FIG. 4 is an exploded perspective view illustrating the piercing unit of the degassing device according to the first embodiment of the present invention.

As illustrated in FIG. 4, the sealing unit 130 comprises first and second heating members 131 and 132 pressing both side surfaces of the secondary battery 1, in which the opening hole 1*a* is formed, and simultaneously applying heat to both the sides surfaces of the secondary battery 1 to seal the opening hole 1*a*.

As illustrated in FIG. 4, the first heating member 131 comprises a first insertion surface 131*a* inserted into a first insertion groove 111*h* formed in one surface of the piercing body 111 in a shape that surrounds the first sealing part 111*a* and a first sealing surface 131*b* pressing the one side of the one surface of the secondary battery 1, in which the opening hole 1*a* is formed, and simultaneously applying heat to the one side of the one surface of the secondary battery 1 to seal the opening hole 1*a*. Here, the first sealing surface 131*b* has a size less than that of the first insertion surface 131*a* to improve coupling with a first cover member.

Figure 8:
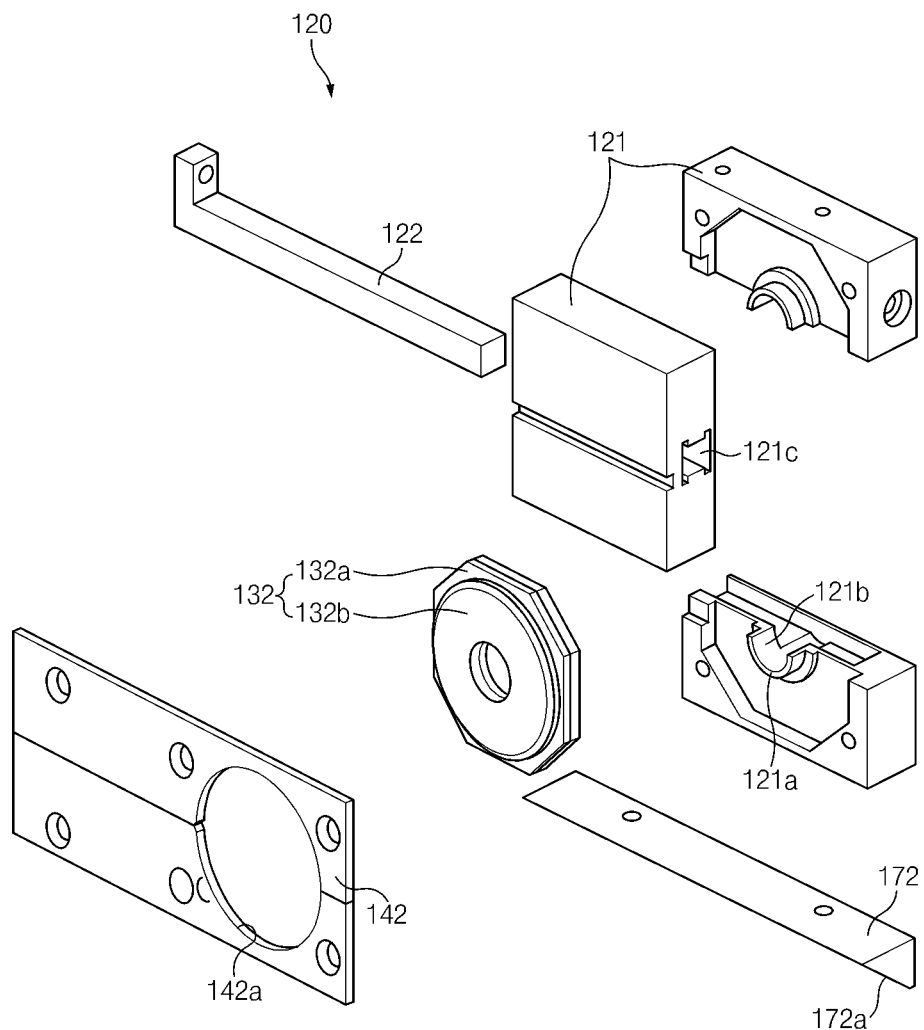
FIG. 8 is an exploded perspective view illustrating the gas discharge unit of the degassing device according to the first embodiment of the present invention.
Figure 9:
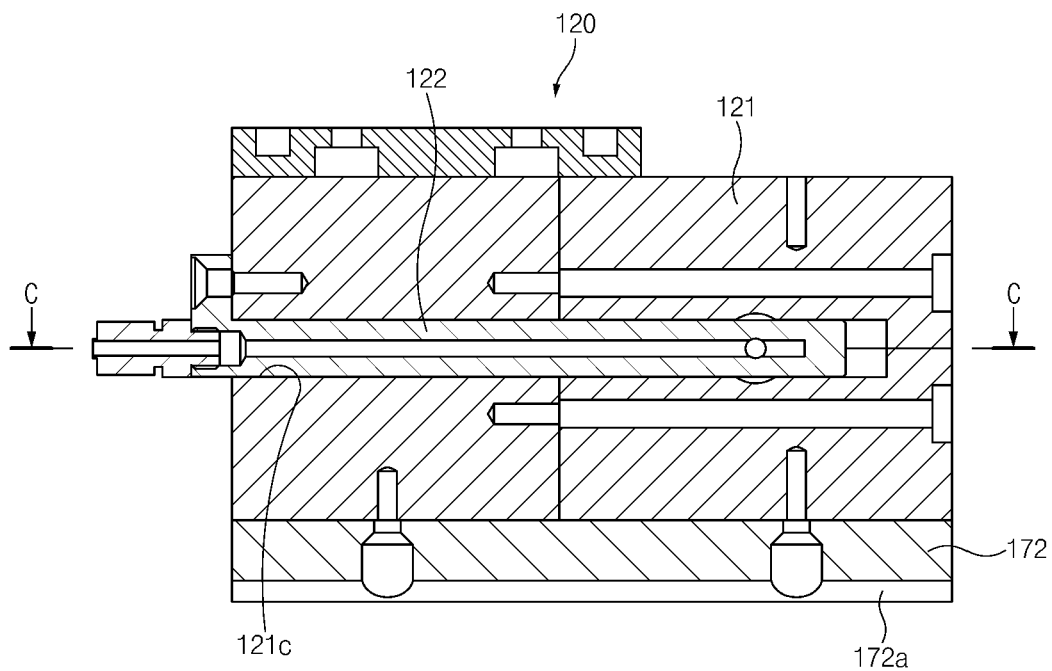
FIG. 9 is a cross-sectional view illustrating the gas discharge unit of the degassing device according to the first embodiment of the present invention.
Figure 10:
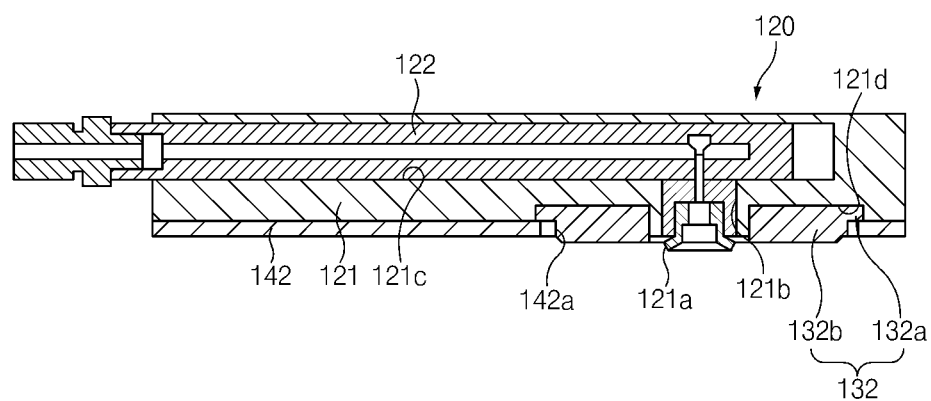
FIG. 10 is a cross-sectional view taken along line C-C of FIG. 9.

As illustrated in FIG. 8, the second heating member 132 comprises a second insertion surface 132*a* inserted into a second insertion groove 121*d* formed in one surface of the gas discharge body 121 in a shape that surrounds the second sealing part 121*a* and a second sealing surface 132*b* pressing the one side of the other surface of the secondary battery 1, in which the opening hole 1a is formed, and simultaneously applying heat to the one side of the other surface of the secondary battery 1 to seal the opening hole 1a. Here, the second sealing surface 132b has a size less than that of the second insertion surface 132a to improve coupling with a second cover member.

Each of the first insertion groove 111h and the first insertion surface 131a or each of the second insertion groove 121d and the second insertion surface 132a has a polygonal shape. Thus, the first and second heating members may be fixed without rotating.

Therefore, the sealing unit 130 may comprise the first and second heating members 131 and 132 to press the surface of the secondary battery 1, in which the opening hole is formed, and simultaneously heat the surface of the secondary battery 1, thereby sealing the opening hole.

Cover Unit

As illustrated in FIGS. 4 and 8, the degassing device 100 according to the first embodiment of the present invention may further comprise a cover unit 140 fixing the first heating member to the piercing unit and fixing the second heating member to the gas discharge unit.

That is, the cover unit 140 comprises a first fixing cover 141 fixing the first heating member 131 inserted into the first insertion groove 111h of the piercing body 111 and a second fixing cover 142 fixing the second heating member 132 inserted into the second insertion groove 121d of the gas discharge body 121.

Here, the first fixing cover 141 has a first through-hole 141a, which is coupled to the entire one surface of the piercing body 111 to pass through the first sealing surface 131b of the first heating member 131. Thus, the first fixing cover 141 may support the first insertion surface 131a of the first heating member 131 inserted into the first insertion groove 111h to fix the first heating member 131, thereby preventing the first heating member 131 from being separated from the piercing body 111.

Also, the second fixing cover 142 has a second through-hole 142a, which is coupled to the entire one surface of the gas discharge body 121 to pass through the second sealing surface 132b of the second heating member 132. Thus, the second fixing cover 142 may support the second insertion surface 132a of the second heating member 132 inserted into the second insertion groove 121d to fix the second heating member 132, thereby preventing the second heating member 132 from being separated from the gas discharge body 121.

Therefore, the cover unit 140 may stably fix the first heating member to the piercing unit and stably fix the second heating member to the gas discharge unit.

Moving Unit

As illustrated in FIGS. 1 and 2, the degassing device 100 according to the first embodiment of the present invention may further comprise a moving unit 150 that allows the piercing unit 110 and the gas discharge unit 120 to move in a direction in which the piercing unit 110 and the gas discharge unit 120 are close to each other so as to be closely attached to the secondary battery 1 or in a direction in which the piercing unit 110 and the gas discharge unit 120 are away from each other so as not to be closely attached to the secondary battery 1.

That is, the moving unit 150 comprises a first moving member 151 allowing the piercing unit 110 to move so as to be closely attached to the one surface of the secondary battery or so as not to be closely attached to the secondary battery and a second moving member 152 allowing the gas discharge unit 120 to move so as to be closely attached to the other surface of the secondary battery or so as not to be closely attached to the secondary battery.

The first moving member 151 comprises a first fixing part 151a fixed to the piercing unit and a first cylinder 151b allowing the first fixing part 151a to move so as to be closely attached to the one surface of the secondary battery or so as not to be closely attached to the secondary battery.

The second moving member 152 comprises a second fixing part 152a fixed to the gas discharge unit and a second cylinder 152b allowing the second fixing part 152b to move so as to be closely attached to the other surface of the secondary battery 1 or so as not to be closely attached to the secondary battery 1.

Thus, the moving unit 150 may allow the piercing unit 110 and the gas discharge unit 120 to move in the direction in which the piercing unit 110 and the gas discharge unit 120 are close to each other so as to be closely attached to the secondary battery 1 or in the direction in which the piercing unit 110 and the gas discharge unit 120 are away from each other so as not to be closely attached to the secondary battery 1.

Figure 14:
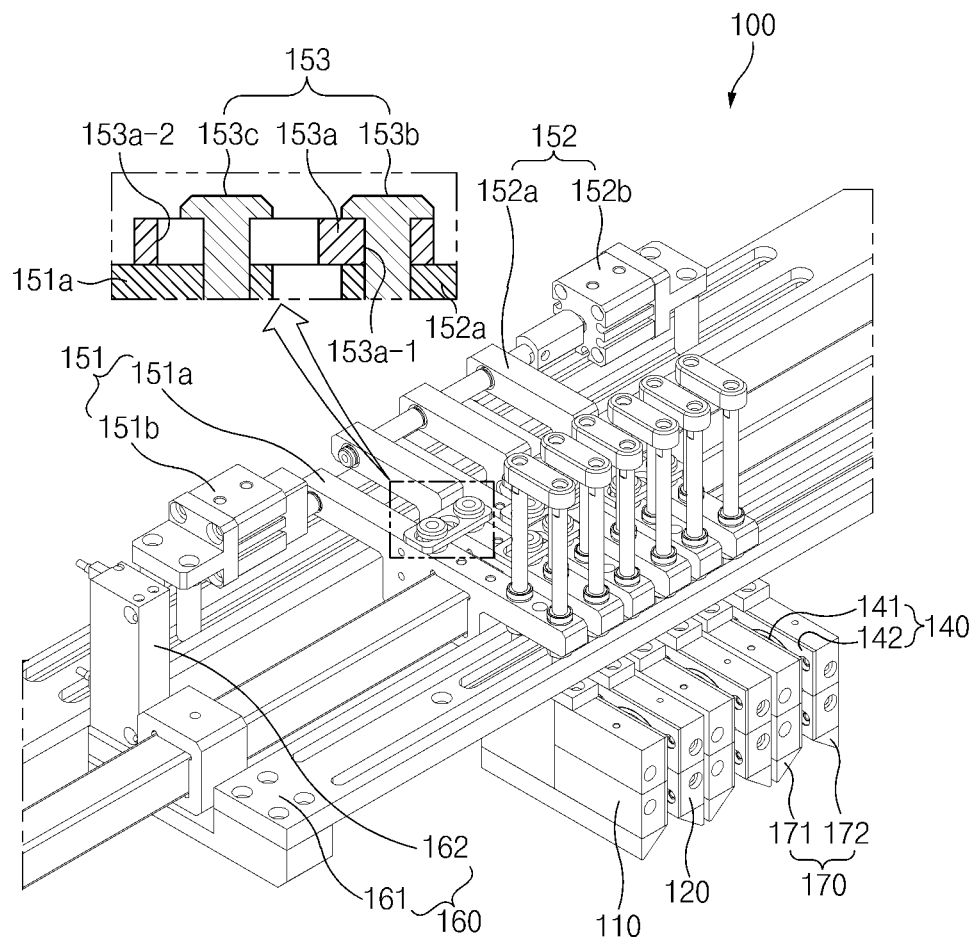
FIG. 14 is a perspective view illustrating a gap adjustment member of the degassing device according to the first embodiment of the present invention.

As illustrated in FIG. 14, the moving unit 150 may further comprise a gap adjustment member 153 restricting a spreading gap between the piercing unit 110 and the gas discharge unit 120. That is, the gap adjustment member 153 comprises an adjustment pin 153a having one side, in which a circular hole 153a-1 is formed, and the other side, in which a long hole 153a-2 is formed in a longitudinal direction, a first bolt 153b coupled to the gas discharge body 121 through the circular hole of the adjustment pin 153a, and a second bolt 153c coupled to the piercing body 111 through the long hole 153a-2 of the adjustment pin 153a.

Thus, in the gap adjustment member 153, the second bolt 153 may move within the long hole 153a-2 of the adjustment pin 153a when the piercing unit 110 and the gas discharge unit 120 move in the direction in which the piercing unit 110 and the gas discharge unit 120 are close to each other so as to be closely attached to the secondary battery 1 or move in the direction in which the piercing unit 110 and the gas discharge unit 120 are away from each other so as not to be closely attached to the secondary battery 1. Thus, the spreading gap between the piercing unit 110 and the gas discharge unit 120 may be adjusted.

Elevation Unit

As illustrated in FIGS. 1 and 2, the degassing device 100 according to the first embodiment of the present invention may further comprise an elevation device 160 allowing the piercing unit 110 and the gas discharge unit 120 to descend so as to be close to the secondary battery 1 or ascend so as to be separated from the secondary battery 1.

The elevation unit 160 comprises a connection member 161 connecting the piercing unit 110 to the gas discharge unit 120 and a moving cylinder 162 allowing the connection member 161 to descend or return to its original position so that the piercing unit 110 and the gas discharge unit 120 descend or return to their original positions in the direction of the secondary battery 1.

That is, when the elevation unit 160 allows the connection member 161 to descend or ascend by the moving cylinder 162, the piercing unit 110 and the gas discharge unit 120, which are connected to the connection member 161, may descend or ascend at the same time.

Therefore, the elevation unit 160 may allow each of the piercing unit 110 and the gas discharge unit 120 to descend or return to its original position so that the piercing unit 110 and the gas discharge unit 120 are respectively disposed on the one surface and the other surface of the secondary battery 1.

Guide Unit

As illustrated in FIGS. 4 and 8, the degassing device 100 according to the first embodiment of the present invention may further comprise a guide unit 170 which guides the piercing unit 110 and the gas discharge unit 120 so as not to interfere with the secondary battery 1 when the piercing unit 110 and the gas discharge unit 120 descend toward the secondary battery 1.

The guide unit 170 comprises a first guide member 171 provided on a bottom surface of the piercing unit 110 toward the secondary battery 1 and a second guide member 172 provided on a bottom surface of the gas discharge unit 120 toward the secondary battery 1.

Here, the bottom surfaces of the first and second guide members 171 and 172 are formed as inclined surfaces 171a and 172a that are inclined toward the secondary battery.

Thus, the guide unit 170 may guide the secondary battery 1 through the inclined surfaces 171a and 172a of the first and second guide members 171 and 172 when the piercing unit 110 and the gas discharge unit 120 descend toward the secondary battery to prevent the secondary battery from being pressed.

Hereinafter, in descriptions of another embodiment of the present invention, constituents having the same function as the above-mentioned embodiment have been given the same reference numeral in the drawings, and thus duplicated description will be omitted.

[Facility for Manufacturing Secondary Battery According to Second Embodiment of the Present Invention]

Figure 15:
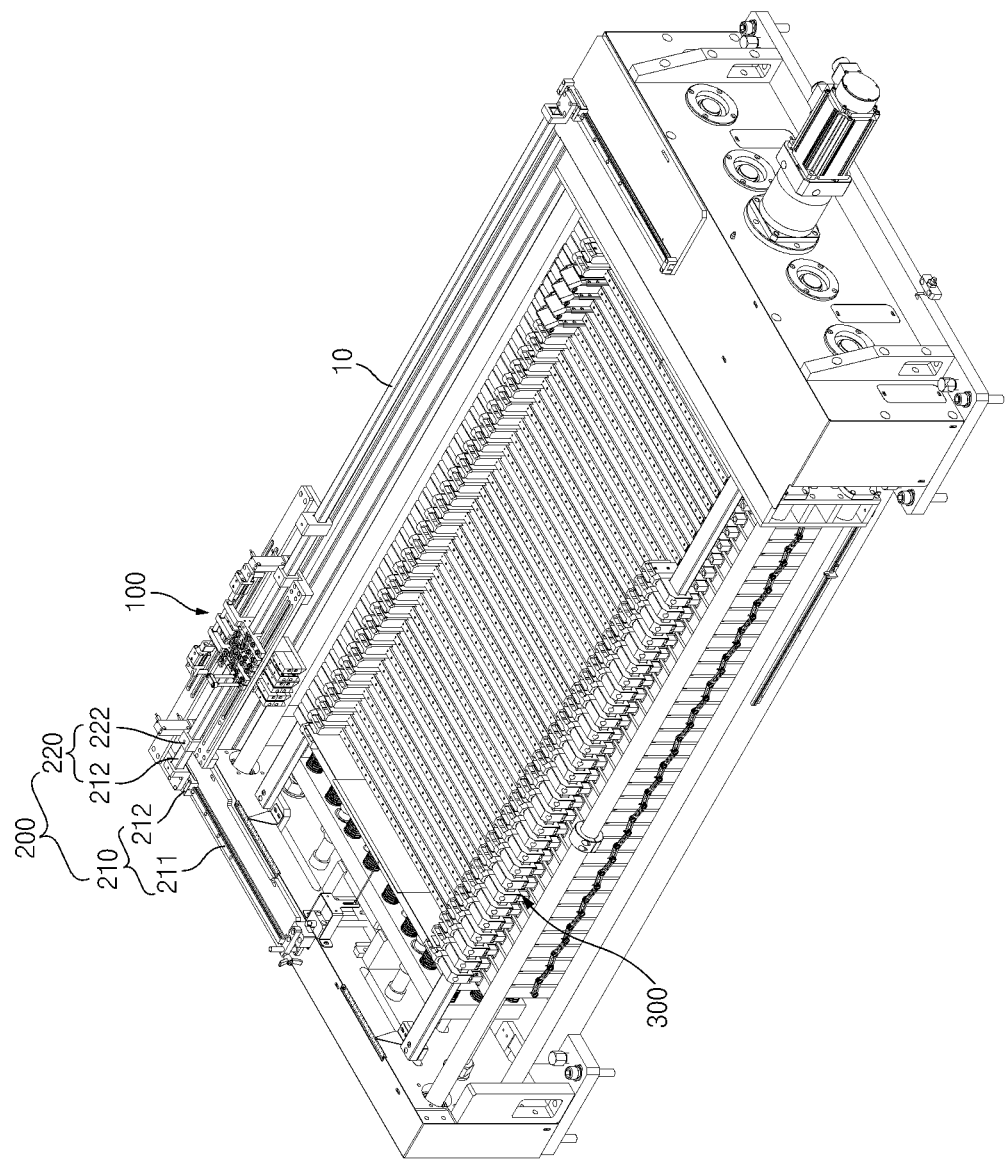
FIG. 15 is a perspective view illustrating a facility for manufacturing a secondary battery according to a second embodiment of the present invention.
Figure 16:
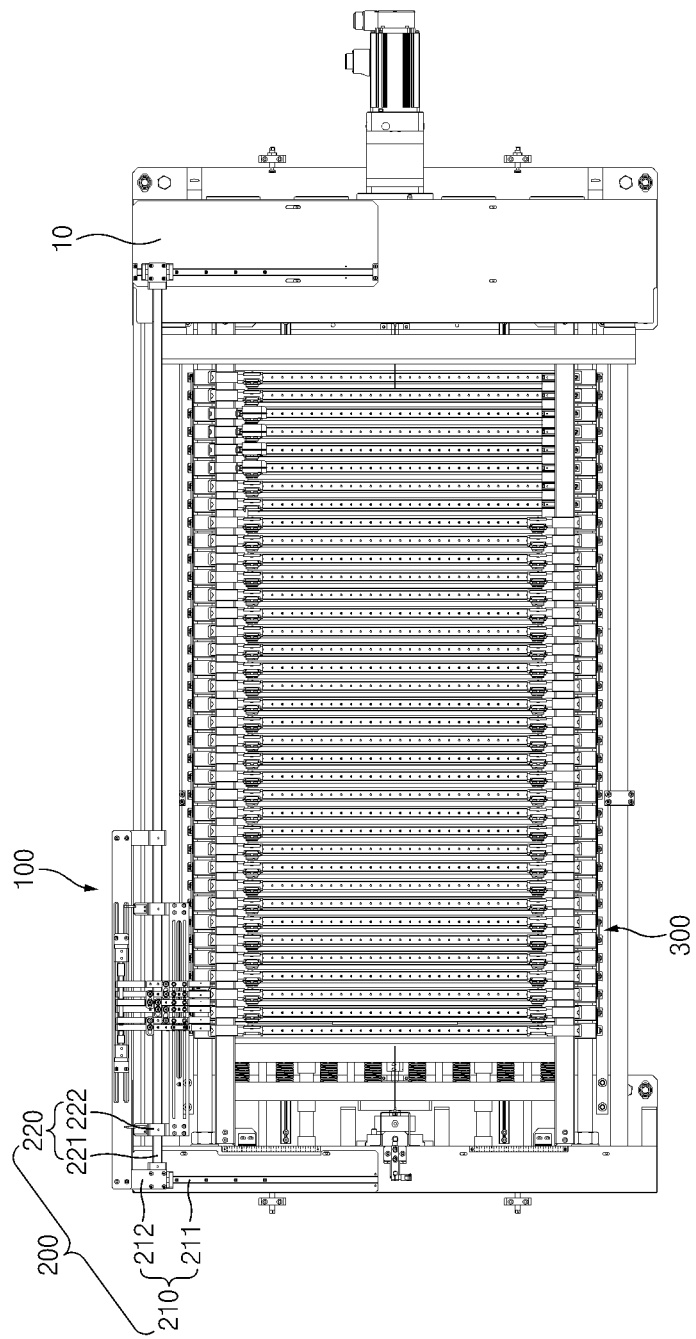
FIG. 16 is a plan view illustrating the facility for manufacturing a secondary battery according to the second embodiment of the present invention.
Figure 17:
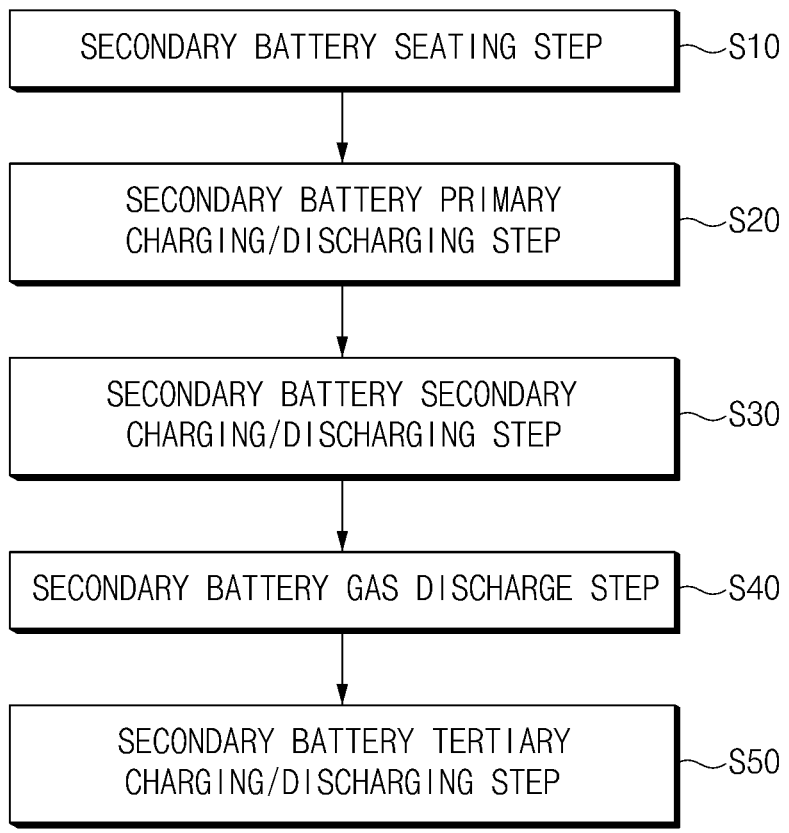
FIG. 17 is a flowchart illustrating a method for manufacturing the second battery according to the second embodiment of the present invention.

As illustrated in FIGS. 15 and 16, a facility for manufacturing a secondary battery according to a second embodiment of the present invention comprises a main body 10 on which the secondary battery 1 is seated and a degassing device 100 discharging a gas generated in the secondary battery 1 seated on the main body 10 to the outside.

Main Body

The main body 10 has a box shape and is provided with a plurality of jigs, on which the secondary battery is seated, on a bottom surface thereof. The plurality of jigs may be disposed in a longitudinal direction of the main body to seat a plurality of secondary batteries to be spaced a predetermined distance from each other. Here, each of the secondary batteries are seated on each of the jigs in a state in which an electrode lead of the secondary battery is erected horizontally to face a wall of the main body.

Degassing Device

Referring to FIGS. 1 to 14, the degassing device 100 is installed on a top surface of the main body 10 and has a structure in which a gas generated in the secondary battery 1 seated on the main body 10 is discharged to the outside.

That is, the degassing device 100 comprises a piercing unit 110 and a gas discharge unit 120. The piercing unit 110 comprises a piercing body 111 disposed on one surface of the secondary battery to seal one side of the one surface of the secondary battery and a piercing member 112 piercing the one side of the one surface of the secondary battery 1, which is sealed by the piercing body 111, to form an opening hole. Also, the gas discharge unit 120 comprises a gas discharge body 121 disposed on the other surface of the secondary battery 1 to seal one side of the other surface of the secondary battery 1, in which the opening hole is formed, and a gas discharge member 122 discharging the gas within the secondary battery 1 to the outside through the opening hole.

Here, the piercing member 112 has the opening hole that passes from the one side of the one surface to the one side of the other surface of the secondary battery.

The degassing device 100 has the same configuration as the degassing device according to the first embodiment of the present invention, and thus, detailed description thereof will be omitted.

Therefore, the facility for manufacturing the secondary battery according to the second embodiment of the present invention may effectively remove the gas generated in the secondary battery.

Moving Device

The facility for manufacturing the secondary battery according to the second embodiment of the present invention further comprises a moving device 200 allowing the degassing device 100 to move in a longitudinal direction of the secondary battery 1 seated on the main body 10 or move in a thickness direction of the secondary battery 1.

That is, the moving device 200 comprises a front/rear moving unit 210 allowing the degassing device 100 in the longitudinal direction of the secondary battery 1 and a left/right moving unit 220 allowing the degassing device 100 in the thickness direction of the secondary battery 1 seated on the main body 10.

The front/rear moving unit 210 comprises a front/rear rail 211 provided in the longitudinal direction of the secondary battery seated on the main body 10 and a front/rear moving member 212 having one end coupled to the front/rear rail 211 and the other end coupled to the degassing device 100 to allow the degassing device 100 to move along the front/rear rail 211. Thus, the front/rear moving unit 210 may allow the degassing device 100 to move in the longitudinal direction of the secondary battery 1 so that the degassing device 100 is accurately disposed on the secondary battery 1.

The left/right moving unit 220 comprises a left/right rail 221 provided in the thickness direction of the secondary battery seated on the main body 10 and a left/right moving member 222 having one end coupled to the left/right rail 221 and the other end coupled to the degassing device 100 to allow the degassing device 100 to move along the left/right rail 221. Thus, the left/right moving unit 220 may allow the degassing device 100 to move in the thickness direction of the secondary battery 1 so that the degassing device 100 is accurately disposed on the secondary battery 1.

Here, the front/rear moving unit 210 allows the left/right moving unit 220 and the degassing device 100 to move together in the front/rear direction of the secondary battery. Thus, when the degassing device 100 moves, an interference between the front/rear moving unit 210 and the left/right moving unit 220 may be prevented.

Charging/Discharging Device

The facility for manufacturing the secondary battery according to the second embodiment of the present invention further comprises a charging/discharging device 300 charging and discharging the secondary battery seated on the main body to activate the secondary battery. The charging/discharging device 300 performs the charging/discharging through an electrode lead of the secondary battery seated on the main body 10.

Therefore, the facility for manufacturing the secondary battery according to the second embodiment of the present invention may stably charging and discharging the secondary battery and effectively discharge the gas generated in the secondary battery after the charging and discharging.

[Method for Manufacturing Secondary Battery According to Second Embodiment of the Present Invention]

Hereinafter, a method for manufacturing a secondary battery using the facility for manufacturing the secondary battery according to the second embodiment of the present invention will be described.

The method for manufacturing the secondary battery according to the second embodiment of the present invention comprises: a seating step (S10) of seating one or more secondary batteries 1 on a main body 10; a primary charging/discharging step (S20) of primarily charging the secondary battery 1 at a first voltage by using the charging/discharging device 300; a secondary charging/discharging step (S30) of secondarily charging and discharging the secondary battery 1 at a second voltage by using the charging/discharging device 300; a gas discharge step (S40) of discharging a gas generated in the secondary battery 1 to the outside by using a degassing device 100; and a tertiary charging/discharging step (S50) of tertiarily charging and discharging the secondary battery 1, from which the gas is discharged, at a third voltage by using the charging/discharging device 300.

Secondary Battery Seating Step

Referring to FIG. 15, in the secondary battery seating step (S10), the plurality of secondary batteries 1 are seated to be arranged in a longitudinal direction of the main body 10. Here, each of the secondary batteries 1 is seated in a state in which an electrode lead formed on the secondary battery is erected toward the charging/discharging device 300.

After the secondary battery seating step (S10), a degassing device position adjustment step is further performed to adjust a position of the degassing device 100 so that the degassing device 100 is disposed on an upper portion of the secondary battery 1 by using the moving device 100.

Referring to FIG. 1, in the degassing device position adjustment step, a piercing unit 110 and a gas discharge unit 120 move in a thickness direction of the secondary battery through a left/right moving unit 220 so that the secondary battery 1 is adjusted in position to be disposed between the piercing unit 110 and the gas discharge unit 120.

Next, the piercing unit 110 and the gas discharge unit 120 move in a longitudinal direction of the secondary battery through a front/rear moving unit 210 so that the piercing unit 110 and the gas discharge unit 120 are disposed in the same vertical line as a preset pierced portion of the secondary battery 1.

Primary Charging/Discharging Step

In the primary charging/discharging step, an electrode lead of the secondary battery 1 seated on a main body 10 and a charging/discharging device 300 are connected to each other to perform the charging and discharging. Here, the charging/discharging device 300 primarily charges the secondary battery 1 at the first voltage, and the first voltage may be 2.8 V or less. When the primary charging/discharging of the secondary battery is performed, a small amount of gas is generated in the secondary battery to cause a swelling phenomenon.

Secondary Charging/Discharging Step

In the secondary charging/discharging step, the secondary battery that is primarily charged and discharged is secondarily charged and discharged at the second voltage by using the charging/discharging device. Here, the second voltage has a voltage higher than the first voltage. That is, the second voltage has a voltage ranging from 2.8 V to 4.0 V. When the secondary charging/discharging of the secondary battery is performed, the amount of gas generated in the secondary battery increases to significantly increase in swelling phenomenon. As a result, the gas generated in the secondary battery is discharged and removed through the gas discharge step.

Gas Discharging Step

In the gas discharge step, the gas generated in the secondary battery is discharged to the outside by using the degassing device 100 according to the first embodiment of the present invention.

That is, referring to FIGS. 1 to 14, in the degassing device 100, the piercing unit 110 and the gas discharge unit 120 descend toward the secondary battery 1 through the elevation unit 160 so that the piercing unit 110 and the gas discharge unit 120 are disposed at a preset pierced portion of the secondary battery 1.

Here, an upper portion of the secondary battery 1, in which an electrolyte is not provided so that the electrolyte accommodated in the secondary battery 1 does not leak, is set as the pierced portion.

Next, the piercing unit 110 and the gas discharge unit 120 move in a direction in which the piercing unit 110 and the gas discharge unit 120 are close to each other through the moving unit 150, and then, the piercing unit 110 and the gas discharge unit 120 are pressed to both surfaces of the secondary battery 1. Here, a first sealing part 111a of a piercing body 111 provided in the piercing unit 110 seals one side of one surface of the secondary battery 1 while being closely attached to the one surface of the secondary battery 1, and a second sealing part 121a of a gas discharge body 121 provided in the gas discharge unit 120 seals one side of the other surface of the secondary battery 1 while being closely attached to the one side of the other surface of the secondary battery 1.

Next, the one side of the one surface of the secondary battery 1 may be pierced through the piercing unit 110 to form an opening hole, and suction force may be generated in the opening hole formed in the secondary battery through the gas discharge unit to discharge the gas within the secondary battery through the opening hole, thereby removing the gas within the secondary battery.

Next, a surface of the secondary battery, in which the opening hole is formed, is sealed through a sealing unit 130 comprising a first heating member 131 provided in the piercing unit 110 and a second heating member 132 provided in the gas discharge unit 120 to seal the opening hole.

When the above processes are completely performed, the piercing unit 110 and the gas discharge unit 120 return to its original position through the moving unit 150, the elevation unit 160, a front/rear moving unit 210, and a left/right moving unit 220.

The degassing device has the same configuration as the degassing device according to the first embodiment of the present invention, and thus, detailed description and function thereof will be omitted.

Tertiary Charging/Discharging Step

In the tertiary charging/discharging step, the secondary battery 1 from which the gas is discharged is tertiarily charged and discharged at the third voltage by using the charging/discharging device 300. Here, the third voltage has a voltage higher than the second voltage. That is, the third voltage is 4.0 V or more.

The secondary charging/discharging step (S30) and the gas discharge step (S40) may be performed at the same time. Thus, when the secondary charging/discharging of the secondary battery is performed, the gas within the secondary battery may be discharged to prevent the swelling from occurring in the secondary battery, thereby improving charging/discharging efficiency.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A degassing device, which discharges a gas generated in a secondary battery to the outside, the degassing device comprising:
a piercing unit comprising a piercing body and a piercing member, wherein the piercing body includes a first sealing part formed on one surface of the piercing body and configured to be disposed on a first surface of the secondary battery to seal one side of the first surface of the secondary battery and a guide passage extending from an outlet hole formed inside the first sealing part and connected to the outlet hole, and wherein the piercing member is provided in the guide passage and configured to be withdrawn out of the outlet hole so that the piercing member is configured to pierce the sealed one side of the first surface of the secondary battery to form an opening hole in the secondary battery; and
a gas discharge unit comprising a gas discharge body configured to be disposed on a second surface of the secondary battery to seal one side of the second surface of the secondary battery, in which the opening hole is formed, and a gas discharge member configured to discharge the gas within the secondary battery to the outside through the opening hole,
wherein the piercing member is configured to form the opening hole passing from the one side of the first surface to the one side of the second surface of the secondary battery.

2. The degassing device of claim 1, wherein the piercing body further comprises:
first and second air injection parts through which air is injected into one side and another side of the guide passage, respectively.

3. The degassing device of claim 2, wherein the piercing member comprises:
a piercing part provided in the outlet hole and configured to pierce the one side of the first surface of the secondary battery while being withdrawn out of the outlet hole to form the opening hole; and
a piston part provided in the guide passage and configured to withdraw the piercing part out of the outlet hole while moving forward in a direction of the piercing part when the air is introduced through the first air injection part, and configured to insert the piercing part into the outlet hole while returning to its original position when the air is introduced into the guide passage through the second air injection part.

4. The degassing device of claim 3, wherein the piercing part comprises:
a piercing pin provided in the outlet hole to pierce the one side of the first surface of the secondary battery while being withdrawn out of the outlet hole; and
a piercing piece having one end connected to the piston part and another end connected to the piercing pin to withdraw or insert the piercing pin out of or into the outlet hole when the piston part moves forward or returns to its original position.

5. The degassing device of claim 4, wherein a guide hole is formed in the piercing pin in a longitudinal direction of the piston part, wherein the guide hole is gradually inclined toward the outlet hole from an end of one side that is close to the piston part to an end of another side,
the piercing piece is provided with a coupling shaft that is freely rotatably coupled to the guide hole, and
the coupling shaft withdraws the piercing pin out of the outlet hole while moving to the end of the another side of the guide hole when the piercing piece moves forward together with the piston part and inserts the piercing pin into the outlet hole while moving from the end of the another side to the end of the one side of the guide hole when the piercing pin returns to its original position together with the piston part.

6. The degassing device of claim 1, wherein the gas discharge body comprises:
a second sealing part formed on one surface of the gas discharge body and configured to seal one side of the second surface of the secondary battery;
a suction hole provided inside the second sealing part; and
an insertion passage provided in the gas discharge body and connected to the suction hole,
wherein the gas discharge member is inserted into the insertion passage to discharge the gas generated in the secondary battery to the outside through the opening hole disposed in the suction hole by using suction force.

7. The degassing device of claim 1, wherein the degassing device further comprises a sealing unit configured to seal a surface of the secondary battery in which the opening hole is formed,
wherein the sealing unit comprises first and second heating members configured to press the first and second surfaces, respectively, of the secondary battery, and configured to simultaneously apply heat to the first and second surfaces of the secondary battery to seal the opening hole,
wherein the first and second heating members are configured to press the secondary battery and to simultaneously apply heat to the secondary battery to seal the opening hole.

8. The degassing device of claim 7, wherein the first heating member comprises a first insertion surface inserted into a first insertion groove formed in one surface of the piercing body in a shape that surrounds the first sealing part and a first sealing surface configured to seal the one side of the first surface of the secondary battery, in which the opening hole is formed, wherein the first sealing surface has a size less than that of the first insertion surface, and
the second heating member comprises a second insertion surface inserted into a second insertion groove formed in one surface of the gas discharge body in a shape that surrounds the second sealing part and a second sealing surface configured to seal the one side of the second surface of the secondary battery, in which the opening hole is formed, wherein the second sealing surface has a size less than that of the second insertion surface.

9. The degassing device of claim 8, wherein each of the first insertion groove and the first insertion surface has a polygonal shape, or each of the second insertion groove and the second insertion surface has a polygonal shape.

10. The degassing device of claim 9, further comprising a cover unit provided with a first fixing cover fixing the first heating member inserted into the first insertion groove of the piercing body and a second fixing cover fixing the second heating member inserted into the second insertion groove of the gas discharge body.

11. The degassing device of claim 1, further comprising a moving unit that allows the piercing unit and the gas discharge unit to move in a direction in which the piercing unit and the gas discharge unit are closer to each other or in a direction in which the piercing unit and the gas discharge unit are farther away from each other.

12. The degassing device of claim 1, further comprising an elevation device configured to allow the piercing unit and the gas discharge unit to descend toward the secondary battery or return to their original positions.

13. The degassing device of claim 12, further comprising a guide unit provided with a first guide member disposed on a bottom surface of the piercing unit and configured to face the secondary battery and a second guide member disposed on a bottom surface of the gas discharge unit and configured to face the secondary battery,
    wherein the bottom surfaces of the first and second guide members are formed as inclined surfaces that are inclined toward the secondary battery.

14. A facility for manufacturing a secondary battery, the facility comprising:
    a main body configured for the secondary battery to be seated thereon; and
    the degassing device of claim 1 which discharges a gas generated in the secondary battery to the outside when the secondary battery is seated on the main body.

* * * * *